Jan. 12, 1971   H. W. LEE, JR   3,554,823
METHOD FOR MAKING CONTAINER MEANS
Original Filed March 26, 1965   3 Sheets-Sheet 3
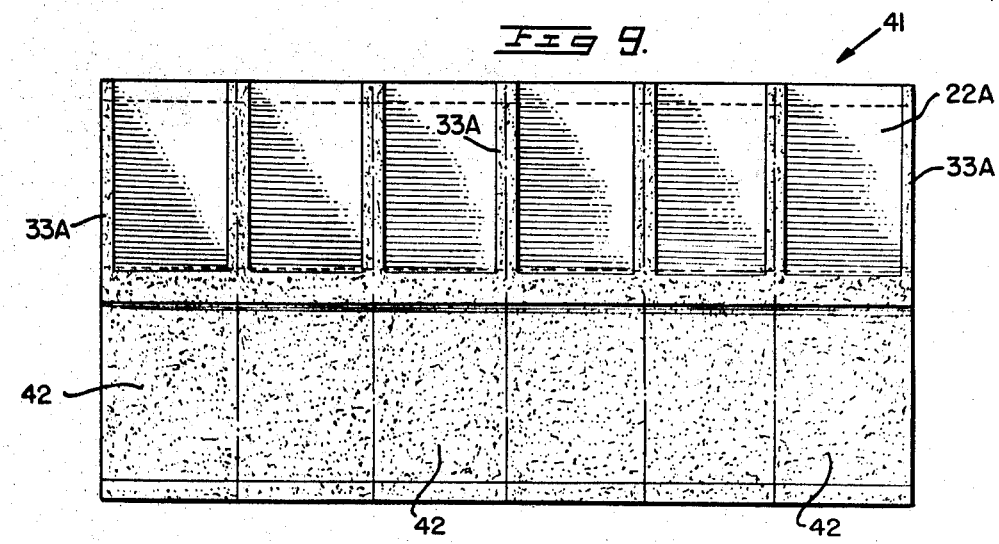
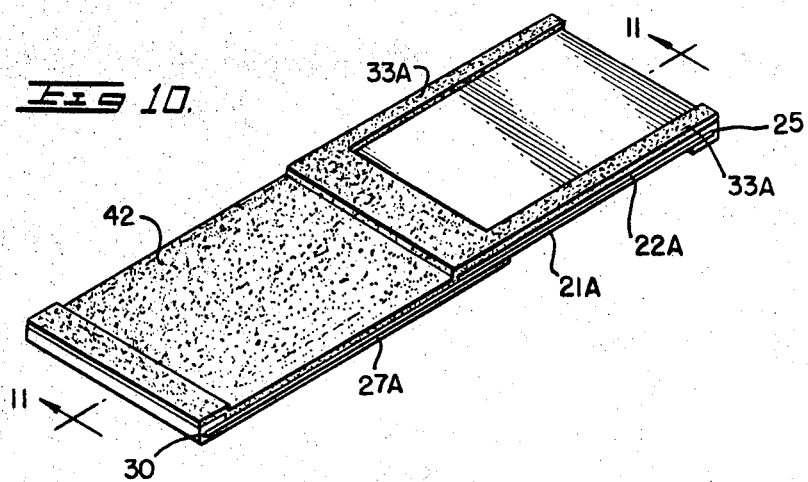
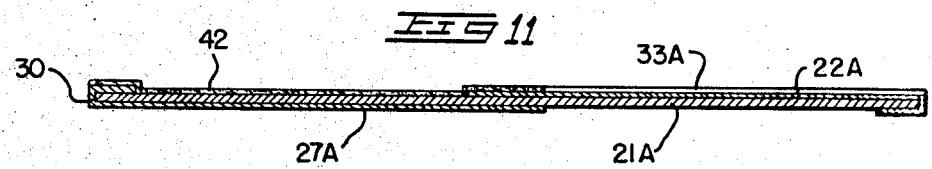
INVENTOR
HARRY W. LEE JR.
BY *Glenn, Palmer & Lyne*
ATTORNEYS United States Patent Office 3,554,823
Patented Jan. 12, 1971

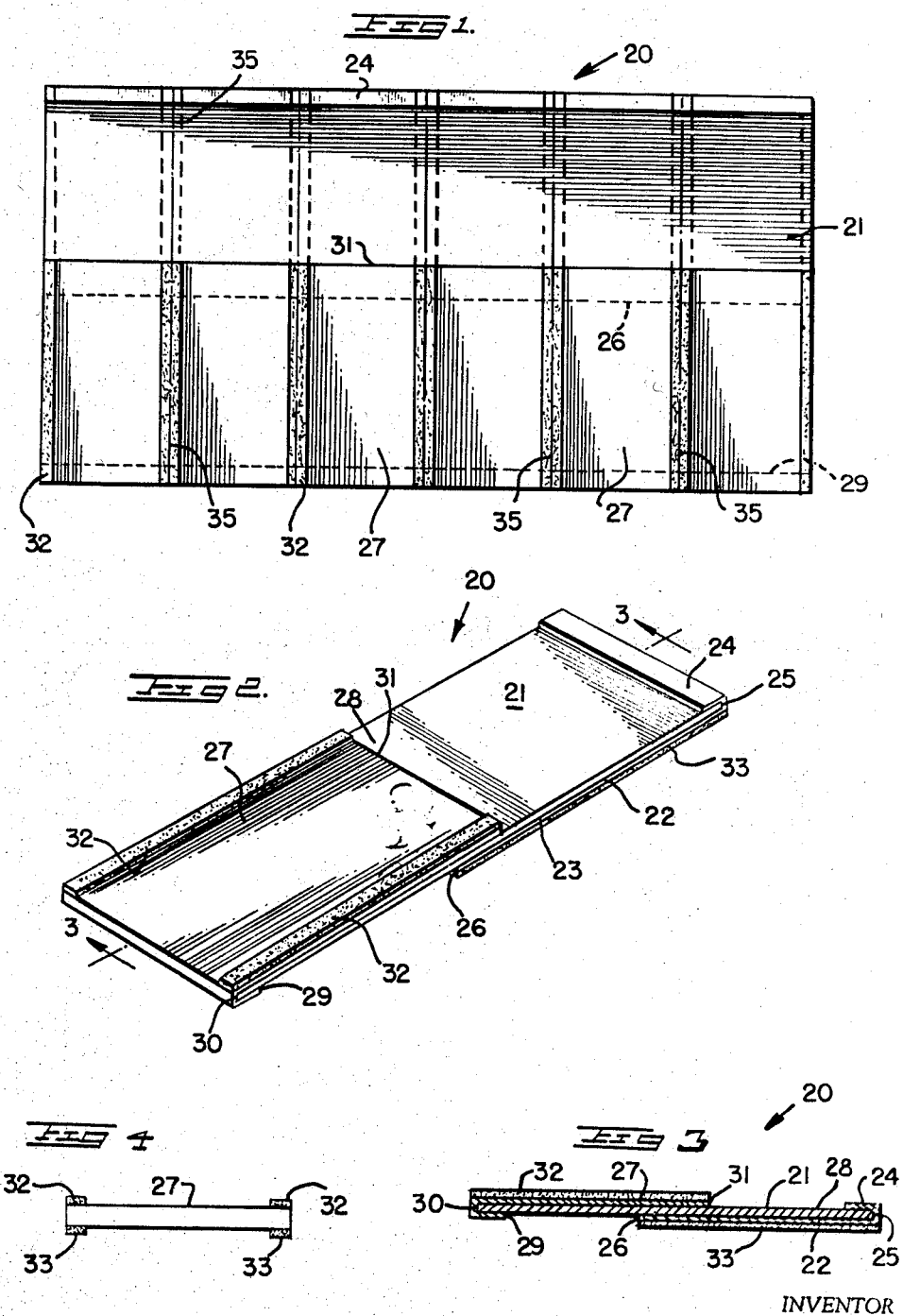

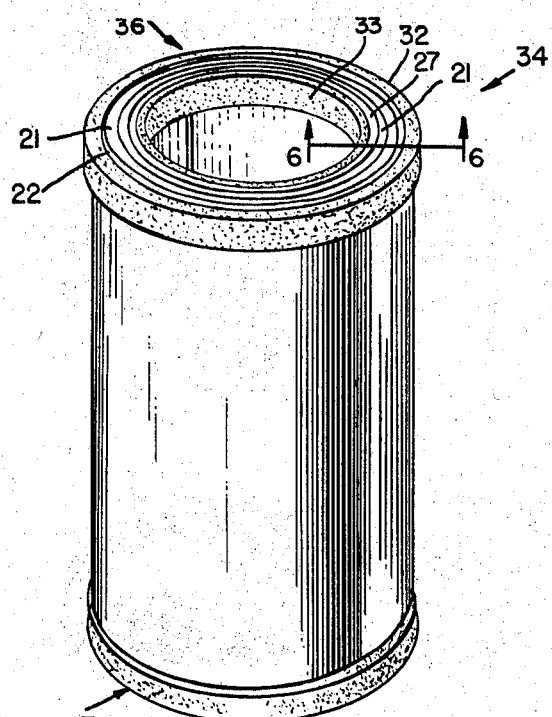
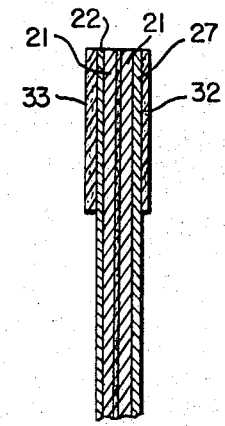
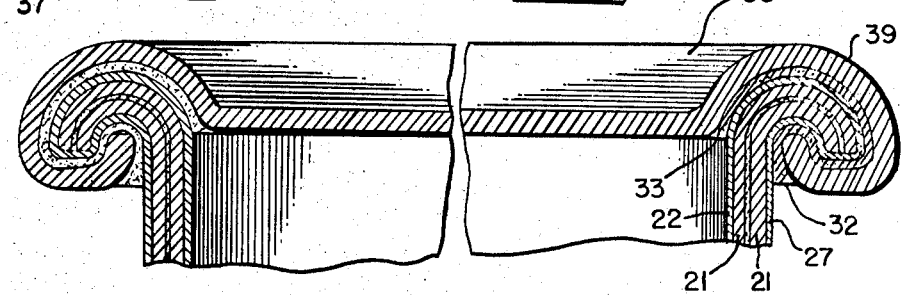
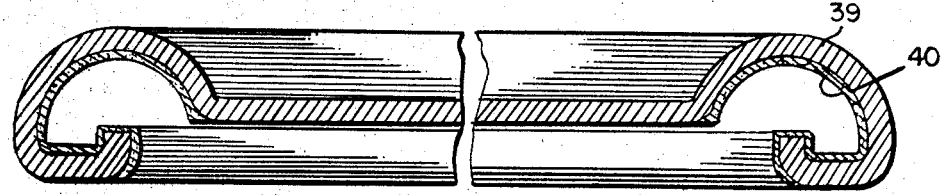
INVENTOR
HARRY W. LEE JR.

3,554,823
METHOD FOR MAKING CONTAINER MEANS
Harry W. Lee, Jr., Chesterfield County, Va., assignor to Reynolds Metals Company, Richmond, Va., a corporation of Delaware
Original application Mar. 26, 1965, Ser. No. 442,965. Divided and this application July 20, 1967, Ser. No. 668,728
Int. Cl. B65b 7/00
U.S. Cl. 156—69       8 Claims

ABSTRACT OF THE DISCLOSURE

This disclosure relates to a method for making cylindrical container bodies by providing an elongated rectangular flat board means and applying lining means to one side thereof and label means to the other side thereof so that the board means can be subsequently convolutely wound to provide a plurality of cylindrical container bodies each having the lining means forming the entire interior surface thereof and the label means forming the entire exterior surface thereof, the flat board means having sealing means disposed thereon in transverse, parallel and spaced relation so that each resulting container body will have an annular band of sealing means at the opposed ends thereof to cooperate with end closures subsequently closing the ends to provide a sealing means for such end closures.

---

This application is a divisional patent application under Rule 147 of its copending parent patent application, Ser. No. 442,965, filed Mar. 26, 1965, and is assigned to the same assignee to whom the parent application is assigned.

This invention relates to an improved convolutely wound container or the like as well as to improved board means for making such a container or the like. In addition, this invention relates to an improved method of making such a container or such a board means.

It is well known that various containers can be formed by convolutely winding board means on a mandrel so that the individual container bodies can be subsequently cut from the container body stock issuing from the end of the mandrel to have the open ends thereof subsequently closed by suitable end closures after the container bodies have been filled with a desired product.

However, it has been found that no fully automatic and economical means have been provided for effecting a fluid sealing between the end closures and the container bodies.

According to the teachings of this invention, however, improved means are provided for automatically and economically providing a sealing means at the ends of the container bodies to be engaged by the end closures closing the open ends of the container bodies to provide a fluid seal therewith.

Accordingly, it is an object of this invention to provide an improved container having one or more of the novel features of this invention as set forth above or hereinafter shown or described.

Another object of this invention is to provide an improved board means for making such a container or the like.

A further object of this invention is to provide an improved method for making such a container means or the like.

Another object of this invention is to provide an improved method for making such a board means or the like.

Other objects, uses and advantages of this invention are apparent from a reading of this description which proceeds with reference to the accompanying drawings forming a part thereof and wherein:

FIG. 1 is a plan view of an improved board means of this invention.

FIG. 2 is a perspective view of one blank of the board means of FIG. 1.

FIG. 3 is a cross-sectional view taken on line 3—3 of FIG. 2.

FIG. 4 is an end view of the blank of FIG. 2.

FIG. 5 is a top perspective view illustrating the blank of FIG. 3 convolutely wound into a container body.

FIG. 6 is a large, fragmentary, cross-sectional view taken on line 6—6 of FIG. 5.

FIG. 7 is an enlarged, fragmentary, cross-sectional view of the container body of FIG. 5 having an end closure secured thereto according to the teachings of this invention.

FIG. 8 is a cross-sectional view of another embodiment of the end closure of this invention.

FIG. 9 is a view similar to FIG. 1 and illustrates another embodiment of this invention.

FIG. 10 is a view similar to FIG. 2 and illustrates a blank from the board means of FIG. 9.

FIG. 11 is a cross-sectional view taken on line 11—11 of FIG. 10.

While the various features of this invention are hereinafter described and illustrated as being particularly adaptable to provide a convolutely wound container, it is to be understood that the various features of this invention can be utilized singly or in any combination thereof to provide other devices as desired.

Therefore, this invention is not to be limited to only the embodiments illustrated in the drawings, because the drawings are merely utilized to illustrate one of the wide variety of uses of this invention.

Referring now to FIG. 1, an improved blank means for forming convolutely wound container bodies is generally indicated by the reference numeral 20 and is fully illustrated in FIGS. 1–4.

The blank means 20 comprises a sheet of flat cardboard-like means 21 for forming the container body structure of the containers of this invention. A strip of lining material, 22, such as metallic foil or a lamination containing metallic foil is secured to the side 23 of the board 21 in any suitable manner and has one end 24 thereof overlapping the end 25 of the board 21 while the other end 26 thereof extends substantially slightly greater than one-half of the length of the board 21, the foil side of the lining material 22 facing outwardly to provide a moisture barrier against the product in a manner hereinafter described.

A wrapper or label strip 27, such as aluminum foil or a lamination containing aluminum foil, is secured to the side 28 of the board 21 and has an end 29 overlapping the end 30 of the board 21 while the other end 31 of the wrapping material 27 extends slightly over one-half of the length of the board means 21, the foil side of the lining material facing outwardly to provide a moisture barrier on the exterior surface of the resulting containers in a manner hereinafter described.

However, it is to be understood that the lining material 22, wrapping material 27 and board 21 can be formed of other materials, as desired.

After the blank 20 has been formed in the manner previously described, sealing means, such as a hot melt wax-like material or the like is applied in spaced parallel strips 32 on the label means 27 and in spaced parallel strips 33 on the liner means 22 in the pattern illustrated in FIGS. 1–3.

After the sealing means 32 and 33 has hardened, the blank 20 illustrated in FIG. 1 can be convolutely wound in a continuous manner on a stationary mandrel in a manner well known in the art whereby the board means 20 is convolutely wound upon itself so that the lining means 22 will form the interior of the container body stock and the wrapper means 27 will form the exterior thereof, the convolutely wound board means 20 being secured together by any suitable adhesive or the like in a conventional manner.

Thereafter, the convolutely wound container body stock issuing from the end of the stationary mandrel is automatically cut into a plurality of container bodies 34, FIG. 5, in a manner well known in the art, along the lines 35 illustrated in FIG. 1 whereby the sealing means 32 and 33 will be at each end of the container bodies 34.

Alternately, the blank means 20 illustrated in FIG. 1 can be separated along lines 35 to provide the small blanks 20 illustrated in FIG. 2 to individually form the convolutely wound container bodies 34.

In any event, the resulting container bodies 34 illustrated in FIG. 5 will each have the band means 32 and 33 of the sealing compound disposed at the opposed open ends 36 and 37 of the container body 34 in the manner illustrated in FIGS. 5 and 6.

In order to close the open ends 36 and 37 of the container body 34, after the same has been filled with the desired product, a suitable end closure 38, FIG. 7, is crimped over one of the ends 36 and 37 in the manner illustrated in FIG. 7 whereby the curled bead 39 of the end closure 38 fully engages the sealing means 32 and 33 to provide a fluid seal therewith.

If desired, the sealing means 32 and 33 can be heat activated so that during the curling operation of the bead 39 of the end closure 38 with the respective and 36 or 37 of the container body 34, the forming roller can be heated to activate the sealing means 32 and 33 to further enhance the sealing effect between the bead 39 and the end 36 or 37 of the container body 34.

If desired, the end closure 38 can also contain sealing means 40 in the manner illustrated in FIG. 8 to complement the sealing means 32 and 33 carried by the container body 34 in the manner previously described.

Therefore, it can be seen that the blank 20 formed according to the teachings of this invention can be automatically convolutely wound on a stationary mandrel or the like with the band means 32 and 33 of the sealing means so disposed thereon that as the resulting container body stock issues from the stationary mandrel, the same can be cut into individual container bodies 34 along the lines 35 illustrated in FIG. 1 to produce the container bodies 34 having the sealing means 32 and 33 at the opposed ends 36 and 37 thereof to provide the fluid-tight seal with the end closures 38 subsequently utilized to close the open ends 36 and 37 in the manner previously described.

If desired, the sealing means at the ends 36 and 37 of the container body 34 can be disposed only on the liner means 22 thereof if desired by merely not placing the bands 32 on the blank 20 illustrated in FIG. 1.

Also, the same sealing means which forms the bands 33 on the insides of the container body 34 can be part of an adhesive pattern placed on the blank 20 to secure together the overlapping portions of the convolutely wound board 20.

In particular, reference is made to FIGS. 9–11 wherein another blank means of this invention is generally indicated by the reference numeral 41 and comprises the board means 21A previously described having the strip of lining means 22A secured thereto and the strip 27A of wrapping material secured thereto in the manner previously described.

However, sealing means 42 is disposed on the board means 21A to provide the means for securing together the overlapping portions of the convolutely wound blank 41, the sealing means 42 also defining the bands 33A which will subsequently provide the annular bands on the inside of the resulting container body in the same manner as the bands 33 illustrated in FIG. 5.

Therefore, it can be seen that the same sealing means utilized to secure together the overlapping portions of the convolutely wound blank 41 will also provide the sealing means for the end closures 38 subsequently utilized to close the open ends of the resulting container bodies.

Therefore, it can be seen that this invention has not only provided an improved blank or board means for forming a convolutely wound container, but also this invention has provided an improved convolutely wound container.

In addition, this invention has provided an improved method of making such board means and/or container.

While the form of the invention now preferred has been disclosed as required by the statutes, other forms may be used, all coming within the scope of the claims which follow.

What is claimed is:

1. A method for making a plurality of containers from a single flat rectangular board having opposed sides comprising the steps of disposing sealing material on at least one side of said board in transverse, parallel and spaced relation, thereafter convolutely winding said board to define a plurality of container bodies in aligned relation, cutting said container bodies from each other at said sealing material so that an annular band of sealing material is at each end of each said container body, and closing said ends of each said container body with end closures which engage said annular bands of sealing material to provide a fluid seal therewith.

2. A method as set forth in claim 1 wherein said step of disposing said sealing material causes said sealing material to only be on the insides of the resulting container bodies.

3. A method as set forth in claim 1 wherein said step of disposing said sealing material causes said sealing material to be on the inside and the outside of the resulting container bodies.

4. A method as set forth in claim 1 wherein said step of convolutely winding said board includes the step of convolutely winding said board upon itself to define said container bodies.

5. A method for making a plurality of containers from a single flat rectangular board having opposed sides comprising the steps of disposing a liner on one side of said board, disposing a wrapper on the other side of said board, disposing sealing material on said liner in transverse, parallel and spaced relation, thereafter convolutely winding said board to define a plurality of container bodies in aligned relation having the liner forming the interior surface thereof and the wrapper forming the exterior surface thereof, cutting said container bodies from each other at said sealing material so that an annular band of sealing material is at each end of each said container body, and closing said ends of each said container body with end closures engaging said annular bands of sealing material to provide a fluid seal therewith.

6. A method as set forth in claim 5 and including the step of disposing sealing material on said wrapper of said flat board in transverse, parallel and spaced relation to subsequently define annular bands of sealing material at each end of each said container body to be engaged by said end closures.

7. A method as set forth in claim 5 wherein said step of convolutely winding said board comprises the step of convolutely winding said board upon itself to define said container bodies.

8. A method as set forth in claim 5 wherein said steps of disposing said liner and said wrapper on said board include the step of overlapping said liner and said wrapper over the ends of said board.

References Cited

UNITED STATES PATENTS 2,349,312  5/1944  Sooy et al. _____ 93—94X
3,311,033  3/1967  Felton Jr., et al. ____ 93—94X
3,338,142  8/1967  Simpson et al. _____ 93—94

CARL D. QUARFORTH, Primary Examiner

S. HELLMAN, Assistant Examiner

U.S. Cl. X.R.

53—13